E. E. PRATT.

CAR DOOR HANGING DEVICE.

No. 7,795. Reissued July 17, 1877.

Witnesses:

Clarence M. Hendrick.

Chas. Rollin Brainard

Inventor:

Elias E. Pratt,

Per C. C. Shaw,

Atty.

UNITED STATES PATENT OFFICE.

ELIAS E. PRATT, OF NORWOOD, MASSACHUSETTS.

IMPROVEMENT IN CAR-DOOR-HANGING DEVICES.

Specification forming part of Letters Patent No. 184,983, dated December 5, 1876; Reissue No. 7,795, dated July 17, 1877; application filed June 25, 1877.

*To all whom it may concern:*

Be it known that I, ELIAS E. PRATT, of Norwood, in the county of Norfolk, State of Massachusetts, have invented certain new and useful Improvements in Devices for Hanging Car-Doors, of which the following is a description sufficiently full, clear, and exact to enable any person skilled in the art or science to which my invention appertains to make and use the same, reference being had to the accompanying drawings, forming a part of this specification, in which—

Figure 1:
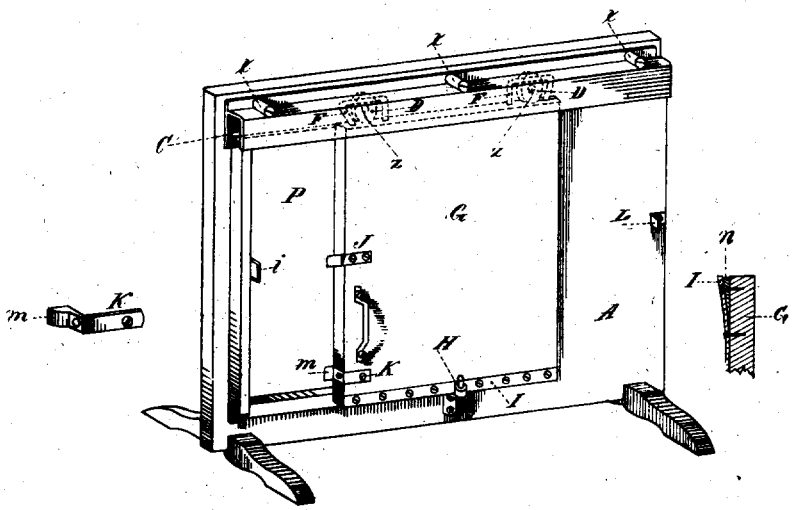
Figure 2:
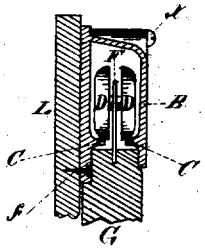
Figure 3:
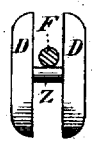

Figure 1 is an isometrical projection, showing the door partially opened and also detached portions of the same; Fig. 2, a vertical cross-section, showing the suspensory hanging devices; Fig. 3, a vertical cross-section taken through the center of a pair of the trucks; and Fig. 4, a view of one of the staples.

Like letters of reference indicate corresponding parts in the different figures of the drawings.

My invention relates, principally, to the doors of freight-cars; and consists in a novel construction and arrangement of the parts, as hereinafter more fully set forth and claimed, by which a more effective means for hanging and operating such doors is produced than is now in ordinary use.

Figure 4:
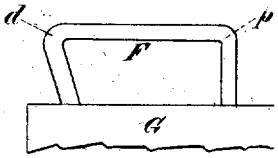

In the drawing, A represents the side of the car; G, the door; and P, the opening in the car which the door is designed to close. Immediately above this opening there is a runlet, B, attached to the side or body of the car by the screws *x f*. This runlet is provided with inwardly and horizontally projecting flanges or lips C C near its base, forming a track on which the trucks or wheels D D roll or traverse, the door G being suspended by means of the staples or lugs F F, which work in a slot or longitudinal opening between the flanges, and rest on the axles *z z*, by which the trucks are connected. The upper ends or loops of the staples are flattened or laterally elongated, as best seen in Fig. 4, having a straight horizontal section from *d* to *p*.

The lower end of the door is provided with a strap, I, and is prevented from swinging outwardly by the friction-roller H. The end of this strap is elevated at the rear edge of the door by means of the lift or wedge *n*, so that when the door is closed the thickened edge of the same, coming into contact with the roller H, will cause the door to be pressed inwardly and make a tight joint at that section of the opening P.

Substantially the same result is accomplished at the front edge of the door by means of the strap K, which is provided with the cam-shaped projection or dog *m*, fitting into a correspondingly-inclined socket (not shown) in the frame of the door, so that when the door is closed the incline *m*, striking the inclined side of the socket, will force this part of the door inwardly, and also form a tight joint, effectually preventing the entrance of sparks, dust, &c., from without.

The top, sides, and track of the runlet B are of metal, and preferably cast integral, the formation of the runlet being such as to completely house or cover the track, wheels, loops, and top of the door, and prevent the working parts described from clogging with snow and ice, and also the entrance of sparks, dust, rain, &c., over the door into the body of the car.

The elongated staples or lugs F give free play to the wheels, and prevent the parts from cramping or binding in moving the door. They also materially lessen the friction, the axle *z* rolling on the under side of the lug F, instead of rotating in a fixed bearing or box as the door is moved back and forth in opening and closing the same, for instance:

The door being closed, the axle *z* will be at *p* or at that part of the lug farthest from the front edge of the door. If, now, the door is moved in a direction to open the same, the truck D will traverse the track formed by the flanges C C, while at the same time the axle *z* will roll along the under side or horizontal portion of the lug F, from *p* to *d*, and vice versa.

The diameter of the axle *z* and the distance from *d* to *p* should correspond—that is to say, the size of the axle and length of the straight horizontal portion of the lug should be such that the door may by fully opened or closed, without bringing the axle into contact with the vertical sides of the lug.

It will be seen that doors hung in this manner may be used readily for barns, warehouses, and in a variety of other places without departing from the spirit of my invention.

Having thus explained my improvement, what I claim is—

1. In a device for hanging the door of a car, the runlet B, provided with the flanges C, and otherwise constructed and arranged to operate substantially as set forth and specified.

2. In a device for hanging the door of a car, the laterally-elongated staple or lug F, constructed and arranged to operate with the trucks D and door G, substantially as set forth and specified.

3. The door G, lugs F, trucks D, and runlet B, combined and arranged to operate substantially as set forth and specified.

4. The door G, provided with the wedge *n*, in combination with the roller H, substantially as set forth and specified.

5. The inclined projection *m*, in combination with the door G, substantially as set forth and specified.

ELIAS E. PRATT.

Witnesses:
C. A. SHAW,
H. E. METCALF.